United States Patent
Kimura et al.

(10) Patent No.: US 12,428,539 B2
(45) Date of Patent: Sep. 30, 2025

(54) METAL-RUBBER COMPOSITE, CONVEYOR BELT, HOSE, RUBBER TRACK, AND TIRE

(71) Applicant: BRIDGESTONE CORPORATION, Tokyo (JP)

(72) Inventors: Kei Kimura, Tokyo (JP); Motoki Amiya, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 461 days.

(21) Appl. No.: 17/642,072

(22) PCT Filed: Aug. 21, 2020

(86) PCT No.: PCT/JP2020/031734
§ 371 (c)(1),
(2) Date: Mar. 10, 2022

(87) PCT Pub. No.: WO2021/065244
PCT Pub. Date: Apr. 8, 2021

(65) Prior Publication Data
US 2024/0092999 A1    Mar. 21, 2024

(30) Foreign Application Priority Data

Sep. 30, 2019 (JP) .................................. 2019-180740
Nov. 28, 2019 (JP) .................................. 2019-215212

(51) Int. Cl.
C08K 5/098 (2006.01)
B62D 55/24 (2006.01)
(Continued)

(52) U.S. Cl.
CPC .............. C08K 5/098 (2013.01); B62D 55/24 (2013.01); B65G 15/36 (2013.01); C08K 3/06 (2013.01);
(Continued)

(58) Field of Classification Search
CPC . C08K 5/098; C08K 3/06; C08K 3/36; C08K 9/02; B62D 55/24; B65G 15/36;
(Continued)

(56) References Cited

U.S. PATENT DOCUMENTS

| | | | |
|---|---|---|---|
| 4,521,558 A | 6/1985 | Mowdood |
| 4,785,033 A | 11/1988 | Mowdood |

(Continued)

FOREIGN PATENT DOCUMENTS

| | | |
|---|---|---|
| CN | 103804726 A | 5/2014 |
| JP | 49-039187 B1 | 10/1974 |

(Continued)

OTHER PUBLICATIONS

JP2007186840A Machine Translation of Description (Year: 2025).*
(Continued)

*Primary Examiner* — Cynthia L Schaller
(74) *Attorney, Agent, or Firm* — Sughrue Mion, PLLC

(57) ABSTRACT

A metal-rubber composite, comprising a metal and a rubber of which at least a portion is adhered to the metal, the composite is characterized in that: a ratio ($C_1/C_2$) of the total concentration ($C_1$) of at least one metal element selected from the group consisting of bismuth, copper, antimony, silver, niobium, molybdenum, zirconium, and nickel in a region within 100 nm measured from an adhesion interface of the metal and the rubber toward the rubber side, with respect to the total concentration ($C_2$) of at least one metal element selected from the group consisting of bismuth, copper, antimony, silver, niobium, molybdenum, zirconium, and nickel in a region between the 100 nm depth and the 200 nm depth, measured from the adhesion interface toward the rubber side, is 7.0 or larger.

20 Claims, 1 Drawing Sheet

(51) Int. Cl.
  *B65G 15/36* (2006.01)
  *C08K 3/06* (2006.01)
  *C08K 3/36* (2006.01)
  *C08K 9/02* (2006.01)
  *F16L 11/08* (2006.01)

(52) U.S. Cl.
  CPC .................. *C08K 3/36* (2013.01); *C08K 9/02* (2013.01); *F16L 11/08* (2013.01)

(58) Field of Classification Search
  CPC ........... B65G 15/34; F16L 11/08; F16L 11/04; C08L 9/06; C08L 21/00; B60C 1/00; B60C 9/00; B32B 15/06
  See application file for complete search history.

(56) References Cited

U.S. PATENT DOCUMENTS

| | | | |
|---|---|---|---|
| 4,929,512 A * | 5/1990 | Nishimura | C23C 30/00 428/941 |
| 5,276,172 A | 1/1994 | Tate et al. | |
| 9,023,928 B2 | 5/2015 | Miyazaki et al. | |
| 2010/0168306 A1 | 7/2010 | Barbotin et al. | |
| 2017/0253722 A1 | 9/2017 | Otsuki et al. | |
| 2019/0375911 A1 | 12/2019 | Otsuki et al. | |

FOREIGN PATENT DOCUMENTS

| | | |
|---|---|---|
| JP | 04-230397 A | 8/1992 |
| JP | 07-011052 A | 1/1995 |
| JP | 2007186840 A * | 7/2007 |
| JP | 2017-185938 A | 10/2017 |
| WO | 2016/039375 A1 | 3/2016 |

OTHER PUBLICATIONS

Extended European Search Report issued Oct. 4, 2023 in European Application No. 20872113.4.
Search Report dated Feb. 17, 2023 in Chinese Application No. 202080067769.9.
International Search Report for PCT/JP2020/031734 dated Nov. 2, 2020 [PCT/ISA/210].
International Preliminary Report on Patentability dated Apr. 5, 2022 with a Translation of the Written Opinion of the International Searching Authority in Application No. PCT/JP2020/031734.

* cited by examiner

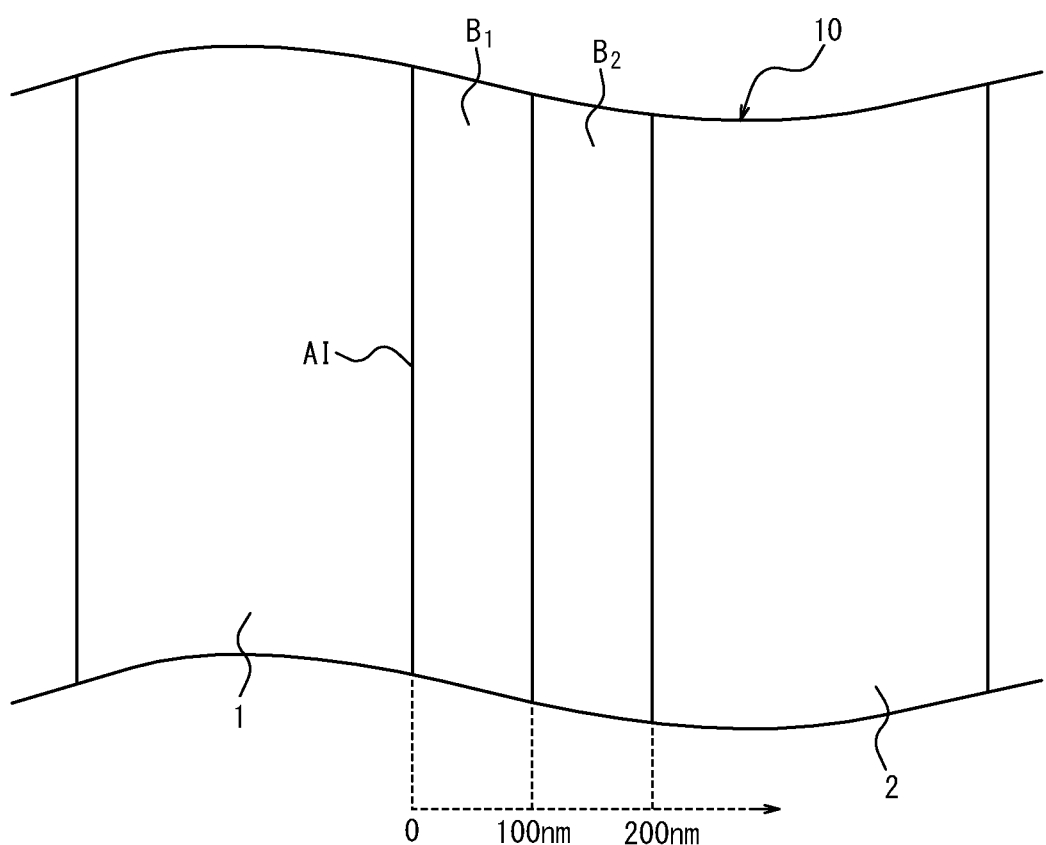

METAL-RUBBER COMPOSITE, CONVEYOR BELT, HOSE, RUBBER TRACK, AND TIRE

CROSS REFERENCE TO RELATED APPLICATIONS

This application is a National Stage of International Application No. PCT/JP2020/031734 filed Aug. 21, 2020, claiming priority based on Japanese Patent Application No. 2019-180740 filed Sep. 30, 2019 and Japanese Patent Application No. 2019-215212 filed Nov. 28, 2019.

TECHNICAL FIELD

The present invention relates to a metal-rubber composite, a conveyor belt, a hose, a rubber track, and a tire.

BACKGROUND ART

A composite of a metal member and rubber (which will be referred to a "metal-rubber composite" hereinafter) is generally used in a rubber article requiring high strength such as a conveyor belt, a hose, a rubber track, a tire, and the like so that the rubber article, of which rubber is reinforced by the metal-rubber composite, exhibits high strength and durability as required. In this respect, the metal member and the rubber must be firmly attached to each other to make the metal-rubber composite reliably demonstrate high strength and durability over a long period.

Conventionally, an adhesion promoter is blended with rubber of a metal-rubber composite in order to effect direct adhesion of the metal and the rubber by vulcanization bonding. Common examples of the adhesion promoter include a cobalt salt of organic acid such as cobalt stearate, cobalt versatate, and the like.

However, there exists concern about toxicity of cobalt salts of organic acids, whereby rubber not containing a cobalt salt has been in demand. To meet the demand, PTL 1 discloses an adhesion promoter composed of a specific metal salt, for rubber-metal adhesion.

CITATION LIST

Patent Literature

PTL 1: WO 2016/039375 A1

SUMMARY OF THE INVENTION

Technical Problem

However, as a result of a keen study by the inventors of the present disclosure, it has been revealed that the adhesion promoter described in PTL 1 does not necessarily cause a satisfactory effect of promoting adhesion between metal and rubber. It is therefore necessary to further improve adhesion between metal and rubber without using a cobalt salt.

In view of this, an object of the present disclosure is to solve the prior art problems described above and provide a metal-rubber composite having an improved adhesion property between metal and rubber.

Further, another object of the present disclosure is to provide a conveyor belt, a hose, a rubber track, and a tire having the metal-rubber composite and exhibiting superior durability.

Solution to Problem

The primary features of the present disclosure for achieving the aforementioned objects are as follows.

A metal-rubber composite of the present disclosure is a metal-rubber composite, comprising a metal and a rubber of which at least a portion is adhered to the metal, the composite characterized in that:

a ratio ($C_1/C_2$) of the total concentration ($C_1$) of at least one metal element selected from the group consisting of bismuth, copper, antimony, silver, niobium, molybdenum, zirconium, and nickel in a region within 100 nm measured from an adhesion interface of the metal and the rubber toward the rubber side, with respect to the total concentration ($C_2$) of at least one metal element selected from the group consisting of bismuth, copper, antimony, silver, niobium, molybdenum, zirconium, and nickel in a region between the 100 nm depth and the 200 nm depth, measured from the adhesion interface toward the rubber side, is 7.0 or larger.

The metal-rubber composite of the present disclosure has superior adhesion properties between metal and rubber.

In a preferable example of the metal-rubber composite of the present disclosure, the rubber is composed of a rubber composition containing 0.01 to 10 parts by mass of sulfur with respect to 100 parts by mass of a rubber component. The metal-rubber composite forms a firm adhesion layer therein and successfully demonstrates a superior adhesion property in this case.

In another preferable example of the metal-rubber composite of the present disclosure, the rubber is composed of a rubber composition containing ≥2 parts by mass of silica with respect to 100 parts by mass of a rubber component. The adhesion property between the metal and the rubber further improves in this case.

In yet another preferable example of the metal-rubber composite of the present disclosure, the rubber is composed of a rubber composition containing ≥1 parts by mass of resorcin with respect to 100 parts by mass of a rubber component. The adhesion property between the metal and the rubber further improves in this case.

In the metal-rubber composite of the present disclosure, it is preferable that the rubber contains at least one selected from the group consisting of: (1) a metal salt of carboxylic acid, having 2 to 25 carbon atoms and any of bismuth, copper, antimony, silver, niobium, molybdenum, zirconium, and nickel as the metal species thereof; and (2) a compound represented by general formula (A) shown below:

$$[(RCOO)_xMO]_3Z \qquad (A)$$

in the general formula (A), "Z" represents one of formulae (z-1), (z-2), (z-3) and (z-4) shown below, "M" represents bismuth, copper, antimony, silver, niobium, molybdenum, zirconium or nickel, each "(RCOO)" independently represents a residue of $C_2$-$C_{25}$ aliphatic carboxylic acid, and "x" represents an integer equal to {(valence of M)−1}.

(z-1)

(z-2)

-continued

(z-3)

(z-4)

The adhesion property between the metal and the rubber further improves in this case. (Said "(1) a metal salt of carboxylic acid" and said "(2) a compound represented by general formula (A)" will occasionally be referred to as "the metal salt of carboxylic acid (1)" and "the compound (2)", respectively, hereinafter).

In the present disclosure, it is preferable that the rubber composition contains the metal salt of carboxylic acid (1) described above and that the metal species in the metal salt of carboxylic acid (1) is bismuth or copper. The adhesion property between the metal and the rubber remains satisfactory even under hot and humid conditions in this case.

Further, it is preferable that the rubber composition contains the metal salt of carboxylic acid (1) and that the carboxylic acid in the metal salt of carboxylic acid (1) is an aliphatic monocarboxylic acid or an aliphatic dicarboxylic acid. Relevant raw materials are easily available in this case.

Yet further, it is more preferable that the carboxylic acid in the metal salt of carboxylic acid (1) is a $C_{2-20}$ saturated aliphatic monocarboxylic acid. The metal salt of carboxylic acid (1) is less likely to affect sulfur crosslinking of a rubber component, whereby a cured rubber, of which rubber properties have been less adversely affected than otherwise, can be obtained in this case.

Yet further, it is still more preferable that the carboxylic acid in the metal salt of carboxylic acid (1) is 2-ethylhexanoic acid, neodecanoic acid, hexadecanoic acid or octadecanoic acid. The metal salt of carboxylic acid (1) is even less likely to affect sulfur crosslinking of a rubber component, whereby a cured rubber, of which rubber properties have been even less adversely affected than otherwise, can be obtained in this case.

Yet further, it is preferable that the rubber composition contains the compound (2) represented by general formula (A) described above and that "M" in the compound (2) is bismuth or copper. The adhesion property between the metal and the rubber remains satisfactory even under hot and humid conditions in this case.

Yet further, it is preferable that the rubber composition contains the compound (2) and that "Z" in the compound (2) has a structure represented by the formula (z-1). The adhesion property between the metal and the rubber further improves in this case.

Yet further, it is preferable that the rubber composition contains the compound (2) and that "(RCOO)" in the compound (2) is a residue of a $C_{2-20}$ saturated aliphatic monocarboxylic acid. The compound (2) does not involve itself in crosslinking of a rubber component in this case, thereby more facilitating dispersion/adsorption of the compound (2) to the vicinity of the metal/on a surface of the metal than otherwise so as to more explicitly causing an effect of facilitating adhesion of the metal and the rubber.

Yet further, it is more preferable that (RCOO) in the compound (2) is a residue of 2-ethylhexanoic acid, a residue of neodecanoic acid, a residue of hexadecanoic acid or a residue of octadecanoic acid. The compound (2) does not involve itself in crosslinking of a rubber component in this case, thereby more facilitating dispersion/adsorption of the compound (2) to the vicinity of the metal/on a surface of the metal than otherwise so as to more explicitly causing an effect of facilitating adhesion of the metal and the rubber.

In yet another preferable example of the metal-rubber composite of the present disclosure, the metal is plated with zinc. The adhesion property between the metal and the rubber further improves in this case.

A conveyor belt of the present disclosure is characterized in that it has the metal-rubber composite described above. The conveyor belt of the present disclosure has superior durability accordingly.

A hose of the present disclosure is characterized in that it has the metal-rubber composite described above. The hose of the present disclosure has superior durability accordingly.

A rubber track of the present disclosure is characterized in that it has the metal-rubber composite described above. The rubber track of the present disclosure has superior durability accordingly.

A tire of the present disclosure is characterized in that it has the metal-rubber composite described above. The tire of the present disclosure has superior durability accordingly.

Advantageous Effect

According to the present disclosure, it is possible to provide a metal-rubber composite having an improved adhesion property between metal and rubber. Further, according to the present disclosure, it is possible to provide a conveyor belt, a hose, a rubber track, and a tire having the metal-rubber composite and exhibiting superior durability.

BRIEF DESCRIPTION OF THE DRAWINGS

In the accompanying drawing, wherein:
FIG. 1 is a sectional view schematically showing an example of adhesion interface between metal and rubber.

DETAILED DESCRIPTION

Hereinafter, a metal-rubber composite, a conveyor belt, a hose, a rubber track, and a tire of the present disclosure will be demonstratively described in detail based on embodiments thereof with reference to the drawing.
<Metal-Rubber Composite>
FIG. 1 is a sectional view schematically showing an example of adhesion interface between metal and rubber of a metal-rubber composite of the present disclosure. The metal-rubber composite 10 shown in FIG. 1 has a metal 1 and a rubber 2 of which at least a portion is adhered to the metal 1.

In the present disclosure, a ratio ($C_1/C_2$) of the total concentration ($C_1$) of at least one metal element selected from the group consisting of bismuth, copper, antimony, silver, niobium, molybdenum, zirconium, and nickel in a region $B_1$ within 100 nm measured from an adhesion interface AI of the metal 1 and the rubber 2 toward the rubber side, with respect to the total concentration ($C_2$) of at least one metal element selected from the group consisting of bismuth, copper, antimony, silver, niobium, molybdenum, zirconium, and nickel in a region $B_2$ between the 100 nm depth and the 200 nm depth, measured from the adhesion interface toward the rubber side, is 7.0 or larger and preferably 9.0 or larger.

The ratio ($C_1/C_2$) of the total concentrations ($C_1$, $C_2$) of the metal element(s), of 7.0 or larger, indicates that the metal element(s) exists in a condensed state in the vicinity of the adhesion interface AI between the metal 1 and the rubber 2, on the rubber 2 side. Since the metal element(s) exists in a condensed state in the vicinity of the adhesion interface AI on the rubber 2 side, the adhesion property between the metal 1 and the rubber 2 improves, whereby satisfactorily stable adhesion quality can be obtained in this case. When the ratio ($C_1/C_2$) of the total concentrations ($C_1$, $C_2$) of the metal element(s) is 9.0 or larger, the adhesion property between the metal 1 and the rubber 2 further improves in this respect.

The upper limit of the ratio ($C_1/C_2$) of the total concentrations ($C_1$, $C_2$) of the metal element(s) is not particularly restricted and the total concentration ($C_2$) of the metal element(s) in the region $B_2$ may be zero. The ratio ($C_1/C_2$) of the total concentrations ($C_1$, $C_2$) of the metal element(s) is generally $\leq 100$.

The vicinity of the adhesion interface AI of the metal 1 and the rubber 2, on the rubber 2 side, i.e., the region $B_1$, contains at least one metal element selected from the group consisting of bismuth, copper, antimony, silver, niobium, molybdenum, zirconium, and nickel and the region $B_2$ generally contains at least one metal element selected from the group consisting of bismuth, copper, antimony, silver, niobium, molybdenum, zirconium, and nickel. In this respect, it is preferable that the region $B_1$ and the region $B_2$ contain at least one metal element selected from the group consisting of bismuth, copper, antimony, silver, niobium, molybdenum. Each of the region 1 and the region $B_2$ may contain either only one or two or more types of the aforementioned metal elements.

A ratio ($C_1/C_2$) of the total concentration ($C_1$) of the metal element in the region $B_1$ within 100 nm measured from an adhesion interface AI of the metal 1 and the rubber 2 toward the rubber side (i.e., between the 0 nm depth and the 100 nm depth, measured from the adhesion interface AI toward the rubber side), with respect to the total concentration ($C_2$) of the metal element in the region $B_2$ between the 100 nm depth and the 200 nm depth, measured from the adhesion interface of the metal 1 and the rubber 2 toward the rubber side, is measured by a transmission electron microscope (TEM), as described in Examples shown below. The shortest distances measured from the adhesion interface AI to the ends of the region $B_1$ and the region $B_2$ represent the "depths" thereof, respectively.

The metal (metal member) 1 of the metal-rubber composite 10 functions as a reinforcing material of the metal-rubber composite 10 and enhances strength of a rubber article having the metal-rubber composite 10 therein. Type of the metal 1 is not particularly restricted and the metal 1 may have various configurations. In one embodiment of the present disclosure, the metal 1 is a metal cord. The metal cord is preferably constituted of either a plurality of metal wires (metal steel wires) twisted around each other or a single metal wire. Type of the metal wire is not particularly restricted and examples thereof include wires made of iron, steel (stainless steel), lead, aluminum, copper, brass, bronze, Monel metal alloy, nickel, zinc, or the like. In a preferable embodiment of the present disclosure, the metal 1 is a steel cord. In a case where the metal 1 is a steel cord, the metal 1 can be easily deformed to a desired configuration, which results in high productivity of the metal-rubber composite 10.

It is preferable that a plating is formed on a surface of the metal 1. Type of the plating is not particularly restricted and examples thereof include zinc plating, copper plating, brass plating, and the like in terms of ensuring the adhesion property of the metal 1 and the rubber 2. Zinc plating is preferable among these examples. The adhesion property between the metal 1 and the rubber 2 further improves in a case where the metal 1 is plated with zinc. In a case where the metal 1 has a plating layer formed thereon, the plating layer is regarded as a part of the metal, whereby the adhesion interface AI of the metal 1 and the rubber 2 represents an interface of the plating layer and the rubber 2.

A rubber composition having various compounding agents blended with a rubber component therein is applicable to the rubber (the rubber portion of the composite) 2 of the metal-rubber composite 10.

Examples of the rubber component of the rubber composition for use in the rubber 2 include diene-based rubber. Examples of the diene-based rubber include natural rubber (NR), diene-based synthetic rubber, and the like. Examples of the diene-based synthetic rubber include isoprene rubber (IR), butadiene rubber (BR), styrene-butadiene copolymer rubber (SBR), styrene-isoprene-butadiene rubber (SIBR), ethylene-propylene-diene rubber (EPDM), chloroprene rubber (CR), acrylonitrile-butadiene copolymer rubber (NBR), and the like. Natural rubber (NR) is preferable among these examples of the rubber component because NR easily causes strain-induced crystallization and is excellent in fracture resistance. Either a single type or a blend of two or more types of these examples may be used as the rubber component. It is preferable to use natural rubber (NR) and styrene-butadiene copolymer rubber (SBR) in combination as the rubber component in terms of achieving satisfactory fracture resistance of the metal-rubber composite 10.

The rubber composition for use in the rubber 2 preferably contains at least one selected from the group consisting of: (1) a metal salt of carboxylic acid, having 2 to 25 carbon atoms and any of bismuth, copper, antimony, silver, niobium, molybdenum, zirconium, and nickel as the metal species thereof; and (2) a compound represented by general formula (A) shown below:

$$[(RCOO)_x MO]_3 Z \qquad (A)$$

in the general formula (A), "Z" represents one of formulae (z-1), (z-2), (z-3) and (z-4) shown below, "M" represents bismuth, copper, antimony, silver, niobium, molybdenum, zirconium or nickel, each "(RCOO)" independently represents a residue of $C_2$-$C_{25}$ aliphatic carboxylic acid, "x" represents an integer equal to {(valence of M)−1}.

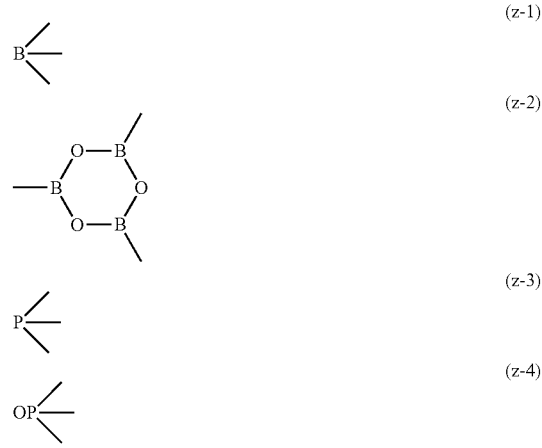

The adhesion property between the metal 1 and the rubber 2 further improves when the rubber composition for use in the rubber 2 contains "(1) the metal salt of carboxylic acid"

and/or "(2) the compound represented by general formula (A)" described above. ("(1) the metal salt of carboxylic acid" and "(2) the compound represented by general formula (A)" will occasionally be referred to as "the metal salt of carboxylic acid (1)" and "the compound (2)", respectively, hereinafter).

The metal salt of carboxylic acid (1) is preferably a metal salt of a $C_{2-25}$ aliphatic carboxylic acid. The metal species of the metal salt is selected from the group consisting of bismuth (Bi), copper (Cu), antimony (Sb), silver (Ag), niobium (Nb), molybdenum (Mo), zirconium (Zr), and nickel (Ni). Bismuth, copper, antimony, and silver are preferable and bismuth and copper are more preferable among these examples of the metal species in terms of achieving satisfactory adhesion of the metal 1 and the rubber 2 even under hot and humid conditions.

Use of a $C_{\geq 2}$ aliphatic carboxylic acid as the carboxylic acid improves compatibility of the metal salt of carboxylic acid (1) with the rubber component, thereby enhancing adhesiveness between the metal 1 and the rubber 2. Use of a $C_{\leq 25}$ aliphatic carboxylic acid as the carboxylic acid makes synthesis of the metal salt of carboxylic acid (1) easy.

Preferable examples of the $C_{2-25}$ aliphatic carboxylic acid include an aliphatic monocarboxylic acid and an aliphatic dicarboxylic acid. In the present disclosure, the number of carbon atoms of a carboxylic acid (aliphatic carboxylic acid) represents the number of carbon atoms including those of the carboxylic group thereof.

Examples of the $C_{2-25}$ aliphatic monocarboxylic acid include a saturated aliphatic monocarboxylic acid, an unsaturated aliphatic monocarboxylic acid, and the like.

Examples of the saturated aliphatic monocarboxylic acid include ethanoic acid, propanoic acid, butanoic acid, pentanoic acid, hexanoic acid, 2-ethylhexanoic acid, heptanoic acid, octanoic acid, nonanoic acid, isononanoic acid, decanoic acid, neodecanoic acid, dodecanoic acid, tetradecanoic acid, hexadecanoic acid, heptadecanoic acid, octadecanoic acid, eicosanoic acid, docosanoic aid, tetracosanoic acid, naphthenic acid, and the like.

Examples of the unsaturated aliphatic monocarboxylic acid include 9-hexadecenoic acid, cis-9-octadecenoic acid, 11-octadecenoic acid, cis,cis-9,12-octadecadienoic acid, 9,12,15-octadecatrienoic acid, 6,9,12-octadecatrienoic acid, 9,11,13-octadecatrienoic acid, eicosanoic acid, 8,11-eicosadienoic acid, 5,8,11-eicosatrienoic acid, 5,8,11,14-eicosatetraenoic acid, tung oil fatty acid, linseed oil fatty acid, soybean oil fatty acid, tall oil fatty acid, resin acid, rosin acid, abietic acid, neoabietic acid, palustric acid, pimaric acid, dehydroabietic acid, and the like.

Examples of the $C_{2-25}$ aliphatic dicarboxylic acid include a saturated aliphatic dicarboxylic acid, an unsaturated aliphatic dicarboxylic acid, and the like. Examples of the saturated aliphatic dicarboxylic acid include oxalic acid, malonic acid, succinic acid, glutaric acid, adipic acid, and the like.

Examples of the unsaturated aliphatic dicarboxylic acid include fumaric acid, maleic acid, and the like.

Among the aforementioned examples of the carboxylic acid, a saturated aliphatic monocarboxylic acid is preferable because the saturated aliphatic monocarboxylic acid is less likely to affect sulfur crosslinking of a rubber component and thus makes it possible to obtain a cured rubber having rubber properties which have been less adversely affected and suitable for use in a conveyor belt, a hose, a rubber track, a tire, and the like, than otherwise. A $C_{2-20}$ saturated aliphatic monocarboxylic acid is preferable; 2-ethylhexanoic acid, neodecanoic acid, hexadecanoic acid and octadecanoic acid are more preferable; and 2-ethylhexanoic acid is particularly preferable among the examples of the saturated aliphatic monocarboxylic acid.

The aforementioned metal salt of carboxylic acid (1) can be obtained, for example, as described in WO 2016/039375, by either (i) "Fusion process", which is a method of manufacturing a metal salt of carboxylic acid by causing a $C_{2-25}$ aliphatic carboxylic acid (a) to directly react with at least one selected from the group consisting of: (b-1) an oxide of metal (bismuth, copper, antimony, silver, niobium, molybdenum, zirconium, or nickel); (b-2) a hydroxide of metal (bismuth, copper, antimony, silver, niobium, molybdenum, zirconium, or nickel); and (b-3) a carbonate of metal (bismuth, copper, antimony, silver, niobium, molybdenum, zirconium, or nickel), or (ii) "Double decomposition process", which is a method of manufacturing a metal salt of carboxylic acid by first causing the $C_{2-25}$ aliphatic carboxylic acid (a) to react with NaOH under the presence of water, to obtain a sodium salt of aliphatic carboxylic acid, and then causing the sodium salt of aliphatic carboxylic acid thus obtained, to react with at least one selected from the group consisting of: (c-1) a sulfate of metal (bismuth, copper, antimony, silver, niobium, molybdenum, zirconium, or nickel); (c-2) a chloride of metal (bismuth, copper, antimony, silver, niobium, molybdenum, zirconium, or nickel); and (c-3) a nitrate of metal (bismuth, copper, antimony, silver, niobium, molybdenum, zirconium, or nickel).

"(RCOO)" in the general formula (A) represents a residue of $C_{2-25}$ aliphatic carboxylic acid. A residue of $C_{\geq 2}$ aliphatic carboxylic acid improves compatibility of the compound (2) with a rubber component, thereby enhancing adhesiveness between the metal 1 and the rubber 2. A residue of $C_{\leq 25}$ aliphatic carboxylic acid not only allows easy synthesis of the compound (2) but also improves dispersion and/or adsorption properties of the compound (2) in a rubber component/on a surface of the metal, thereby increasing an effect of enhancing adhesiveness between the metal 1 and the rubber 2. In the present disclosure, the number of carbon atoms of (RCOO) represents the number of carbon atoms including that (those) of carboxyl group(s).

A residue of aliphatic monocarboxylic acid is preferable as the residue of $C_{2-25}$ aliphatic carboxylic acid. Preferable examples of the residue of aliphatic monocarboxylic acid include residues derived from the aliphatic monocarboxylic acid examples described above.

Among the residues of aliphatic carboxylic acids, a residue of saturated aliphatic monocarboxylic acid is preferable because in the case of this specific residue the compound (2) does not involve itself in crosslinking of a rubber component, thereby facilitating dispersion/adsorption of the compound (2) to the vicinity of the metal/on a surface of the metal and thus more explicitly causing an effect of promoting adhesion of the metal 1 and the rubber 2 than otherwise. Among the residues of saturated aliphatic monocarboxylic acids, a residue of $C_{2-20}$ saturated aliphatic monocarboxylic acid is preferable and a residue of 2-ethylhexanoic acid, a residue of neodecanoic acid, a residue of hexadecanoic acid and a residue of octadecanoic acid are more preferable.

"M" in the general formula (A) represents a metal species and specific examples thereof include bismuth (Bi), copper (Cu), antimony (Sb), silver (Ag), niobium (Nb), molybdenum (Mo), zirconium (Zr), and nickel (Ni). Bismuth, copper, antimony, and silver are preferable and bismuth and copper are more preferable among these examples of the metal species in terms of achieving satisfactory adhesion of the metal 1 and the rubber 2 even under hot and humid conditions.

Further, "x" in the general formula (A) represents an integer equal to {(valence of M)−1}.

"Z" in the general formula (A) represents a structure selected from the group consisting of formulae (z-1), (z-2), (z-3) and (z-4) shown above. A structure represented by the formula (z-1) is preferable among those structures because the (z-1) structure further enhances adhesiveness between the metal 1 and the rubber 2.

The compound (2) represented by the general formula (A) can be produced, for example, by a method as disclosed in WO 2016/039375, of (i) mixing and heating: (a) a $C_{2-25}$ aliphatic carboxylic acid; any of (d-1) a boric acid ester of a $C_{1-5}$ lower alcohol, (d-2) a metaboric acid ester of a $C_{1-5}$ lower alcohol, (d-3) a phosphoric acid ester of a $C_{1-5}$ lower alcohol, and (d-4) a phosphite ester of a $C_{1-5}$ lower alcohol; (e) an acid capable of forming a volatile ester with a $C_{1-5}$ lower alcohol residue present in the (d-1)-(d-4) esters; and (f) a metal compound M as a metal source, and (ii) removing a resulting volatile ester.

Nickel 2-ethylhexanoate and bismuth 2-ethylhexanoate are particularly preferable among the examples of the metal salt of carboxylic acid (1) and the compounds (2) represented by the general formula (A) described above, in terms of achieving satisfactory adhesiveness between the metal 1 and the rubber 2.

The total content of at least one selected from the group consisting of the metal salt of carboxylic acid (1) and the compounds (2) represented by the general formula (A) in a rubber composition for use in the rubber 2 is preferably 0.01 to 20 parts by mass, more preferably 1 to 15 parts by mass, and still more preferably 5 to 10 parts by mass with respect to 100 parts by mass of a rubber component of the rubber composition.

Further, the total content of at least one metal element selected from the group consisting of bismuth, copper, antimony, silver, niobium, molybdenum, zirconium, and nickel in a rubber composition for use in the rubber 2 is preferably ≥0.5 parts by mass, more preferably ≥1.4 parts by mass, and preferably ≤3 parts by mass, more preferably ≤2.8 parts by mass with respect to 100 parts by mass of a rubber component of the rubber composition. Adhesiveness between the metal 1 and the rubber 2 further improves when the total content of the metal element is ≥0.5 parts by mass with respect to 100 parts by mass of the rubber component. The metal element causes relatively little influence on the crosslinking reaction of a rubber component and thus a deterioration rate of the rubber 2 slows down when the total content of the metal element is ≤3 parts by mass with respect to 100 parts by mass of the rubber component.

Examples of a method for effectively condensing the metal element in the vicinity of the adhesion interface AI between the metal 1 and the rubber 2, on the rubber 2 side, include adding silica, resorcin, chlorinated paraffin, or the like to a rubber composition for use in the rubber 2.

Further, in a case where the metal salt of carboxylic acid (1) and the compounds (2) are added to a rubber composition for use in the rubber 2, it is also possible to condense the metal element in the vicinity of the adhesion interface AI between the metal 1 and the rubber 2, on the rubber 2 side, by appropriately selecting types of the metal elements and/or the carboxylic acids. In this regard, nickel is preferable as the metal element and octylic acid is preferable as the carboxylic acid.

Yet further, it is also possible to condense the metal element in the vicinity of the adhesion interface AI between the metal 1 and the rubber 2, on the rubber 2 side, by adjusting the vulcanization conditions (temperature, time, and the like) of the rubber 2.

A rubber composition for use in the rubber 2 contains preferably ≥2 parts by mass and more preferably ≥5 parts by mass of silica with respect to 100 parts by mass of the rubber component. Adhesion between the metal 1 and the rubber 2 further improves in a case where a rubber composition for use in the rubber 2 contains ≥2 parts by mass of silica with respect to 100 parts by mass of the rubber component.

A content of silica is preferably ≤50 parts by mass, more preferably ≤40 parts by mass, still more preferably ≤20 parts by mass, and particularly preferably ≤15 parts by mass, with respect to 100 parts by mass of the rubber component in a rubber composition for use in the rubber 2 in terms of productivity.

Examples of the silica include wet silica (hydrated silica), dry silica (anhydrous silica), surface-treated silica, and the like. Wet silica is preferable in terms of productivity in the mixing and kneading process.

A rubber composition for use in the rubber 2 contains preferably ≤1 parts by mass and more preferably ≤2 parts by mass of resorcin with respect to 100 parts by mass of the rubber component. Adhesion between the metal 1 and the rubber 2 further improves in a case where a rubber composition for use in the rubber 2 contains ≤1 parts by mass of resorcin with respect to 100 parts by mass of a rubber component thereof. A content of resorcin in the rubber composition for use in the rubber 2 is preferably ≤10 parts by mass and more preferably ≤5 parts by mass with respect to 100 parts by mass of the rubber component in the rubber composition for use in the rubber 2.

A rubber composition for use in the rubber 2 contains preferably ≥1 parts by mass and more preferably ≥3 parts by mass of chlorinated paraffin with respect to 100 parts by mass of the rubber component. Adhesion between the metal 1 and the rubber 2 further improves in a case where a rubber composition for use in the rubber 2 contains ≥1 parts by mass of chlorinated paraffin with respect to 100 parts by mass of a rubber component thereof.

A content of chlorinated paraffin in the rubber composition for use in the rubber 2 is preferably ≤30 parts by mass and more preferably ≤20 parts by mass with respect to 100 parts by mass of the rubber component in the rubber composition for use in the rubber 2.

A rubber composition for use in the rubber 2 preferably contains, in addition to the silica described above, carbon black or the like as a reinforcing filler.

Type of the carbon black is not particularly restricted and examples of the grade thereof include SAF, ISAF, HAF, FEF, and the like. Either a single grade or two or more grades in combination, of these examples, may be used as the carbon black. A content of carbon black, which is not particularly restricted, is preferably in the range of 20 to 100 parts by mass and more preferably in the range of 40 to 80 parts by mass with respect to 100 parts by mass of the rubber component.

A rubber composition for use in the rubber 2 contains preferably 0.01 to 10 parts by mass of sulfur with respect to 100 parts by mass of the rubber component. The metal element(s) exists in a condensed state in the vicinity of the adhesion interface AI between the metal 1 and the rubber 2, on the rubber 2 side, as described above. The metal 1, the rubber component in the rubber 2, the metal element(s) existing in a condensed state in the vicinity of the adhesion interface AI, and sulfur form a solid adhesion layer and thus superior adhesiveness is demonstrated in a case where a rubber composition for use in the rubber 2 contains 0.01 to 10 parts by mass of sulfur with respect to 100 parts by mass of the rubber component.

In this respect, a content of sulfur in the rubber composition is more preferably in the range of 1 to 10 parts by mass and still more preferably in the range of 2 to 8 parts by mass with respect to 100 parts by mass of the rubber component.

Type of the sulfur is not particularly restricted and examples thereof include sulfur powder, precipitated sulfur, colloidal sulfur, insoluble sulfur, oil-treated sulfur, and the like.

A rubber composition for use in the rubber 2 preferably contains a vulcanization accelerator. Examples of the vulcanization accelerator include a sulfenamide-based vulcanization accelerator, a thiazole-based vulcanization accelerator, and the like. Examples of the sulfenamide-based vulcanization accelerator include N-cyclohexyl-2-benzothiazolesulfenamide (CZ, CBS), N-tert-butyl-2-benzothiazolesulfenamide (NS, BBS), N-oxydiethylene-2-benzothiazolesulfenamide (OBS), N,N-diisopropyl-2-benzothiazolesulfenamide (DPBS), N,N-dicyclohexyl-2-benzothiazolesulfenamide (DZ, DCBS), and the like. Examples of the thiazole-based vulcanization accelerator include 2-mercaptobenzothiazole (MBT), and the like.

A content of the vulcanization accelerator in the rubber composition is preferably in the range of 0.1 to 12 parts by mass, more preferably in the range of 0.2 to 10 parts by mass, and still more preferably in the range of 0.3 to 9 parts by mass with respect to 100 parts by mass of a rubber component of the rubber composition.

The rubber composition for use in the rubber 2 may optionally be blended with various compounding agents other than the respective components described above. Examples of the compounding agents include stearic acid, zinc white (zinc oxide), wax, oil, antioxidant, processing aid, and the like.

The rubber composition for use in the rubber 2 can be manufactured by mixing and kneading the relevant components by using a mixer such as a Banbury mixer, a kneader, or the like.

A rubber composition for use in the rubber 2 contains preferably ≤0.01 parts by mass and more preferably 0 parts by mass of a cobalt compound with respect to 100 parts by mass of the rubber component of the rubber composition, in terms of proactively addressing environmental regulations anticipated in future. Excluding a cobalt compound from the rubber composition is preferable also in terms of achieving satisfactory deterioration resistance of the rubber composition because addition of a cobalt compound to a rubber composition facilitates thermal deterioration of the composition. There is a possibility that a cobalt compound (or cobalt metal/ion derived from a cobalt compound) migrates from the exterior environment into the rubber 2 at a later stage. However, it is preferable that a cobalt compound is not added at least when a rubber composition for use in the rubber 2 is manufactured.

The metal-rubber composite 10 can be manufactured by, for example, optionally subjecting the metal 1 (cords or the like) to a cleaning process and then making the metal 1 and a rubber composition for the rubber 2 adhere to each other. Examples of a method for making the metal 1 and the rubber 2 adhere to each other include making the metal 1 and the rubber 2 adhere to each other through vulcanization bonding under heat and pressure.

<Conveyor Belt>

A conveyer belt of the present disclosure is characterized in that it has the metal-rubber composite described above. The conveyor belt of the present disclosure has superior durability because it includes therein the metal-rubber composite exhibiting superior adhesiveness between the metal and the rubber.

In one embodiment, the rubber composition for the rubber 2 described above can be used at least for a surface rubber on the inner peripheral side (a lower surface cover rubber) under a metal reinforcing material (the metal 1) made of steel cords or the like, which lower surface cover rubber is brought into contact with a driving pulley, a driven pulley, a shape-keeping rotor, and the like, of a conveyer belt. Further, the rubber composition for the rubber 2 can also be used for a surface rubber on the outer peripheral side (an upper surface cover rubber) on the upper side of the metal reinforcing material (the metal 1), which upper surface cover rubber is brought into contact with an article that is being transported, of the conveyer belt.

Specific examples of a method for manufacturing the conveyor belt described above include: interposing the metal reinforcing material between rubber sheets made of the rubber composition; and then subjecting the rubber sheets to press-attaching under heating, thereby making the metal reinforcing material and the rubber adhere to each other and the former be coated with the latter through vulcanization bonding.

<Hose>

A hose of the present disclosure is characterized in that it has the metal-rubber composite described above. The hose of the present disclosure has superior durability because it includes therein the metal-rubber composite exhibiting superior adhesiveness between the metal and the rubber.

In one embodiment, the hose has an inner rubber layer (an inner tube rubber) located on the inner side in the radial direction thereof, an outer rubber layer located on the outer side in the radial direction thereof, and a metal reinforcing layer (the metal 1) located between the inner rubber layer and the outer rubber layer. The rubber composition for the rubber 2 described above can be used for at least one of the inner rubber layer and the outer rubber layer in one embodiment.

<Rubber Track>

A rubber track of the present disclosure is characterized in that it has the metal-rubber composite described above. The rubber track of the present disclosure has superior durability because it includes therein the metal-rubber composite exhibiting superior adhesiveness between the metal and the rubber.

In one embodiment, the rubber track has: steel cords (the metal 1); an intermediate rubber layer which covers the steel cords such that the steel cords are coated with the intermediate rubber; a metal bar (the metal 1) provided on the intermediate rubber layer; and a main body rubber layer in which the intermediate rubber layer and the metal bar are embedded, wherein a plurality of lugs are formed on the ground contact surface side of the main body rubber layer. The rubber composition for the rubber 2 described above can be used for any portion of the rubber track.

A tire of the present disclosure is characterized in that it has the metal-rubber composite described above. The tire of the present disclosure has superior durability because it includes therein the metal-rubber composite exhibiting superior adhesiveness between the metal and the rubber.

A tire portion, to which the metal-rubber composite of the present disclosure is applicable, is not particularly restricted and the tire portion can be appropriately selected according to necessity. Examples of such a tire portion include carcass, belt, bead core, and the like.

The conventional tire-manufacturing method can be employed as a method for manufacturing the tire of the present disclosure.

For example, a tire (e.g., a pneumatic tire) as desired can be manufactured by sequentially laminating members generally for use in tire production such as a carcass and a belt (the metal-rubber composite 10) made of the rubber composition in the unvulcanized state and metal cords, a tread made of the unvulcanized rubber composition, and the like on a tire building drum; removing the drum, to obtain a green tire; and subjecting the green tire to heating and vulcanization according to the conventional method.

EXAMPLES

The present disclosure will be described further in detail by Examples hereinafter. The Examples by no means restrict the present disclosure.
<Manufacturing Metal-Rubber Composite>

A steel wire having a surface plated with zinc and a diameter of 0.39 mm was prepared as the metal 1.

Further, rubber composition samples were prepared according to the blend formulations shown in Table 1 by using a conventional Banbury mixer. Each of the rubber composition samples thus obtained was formed to a rubber sheet having 2 mm thickness by rolling.

Seven pieces of the steel wires (the metal 1) described above were placed in an aligned manner without gaps therebetween and interposed between the rubber sheets (the rubber 2) of each of the rubber composition samples such that the steel wires were coated with the rubber. A resulting preparatory composite was subjected to vulcanization at 167° C. for 11 minutes, whereby a metal-rubber composite 10 sample was obtained.

A ratio of the metal element concentrations ($C_1/C_2$) was measured and adhesiveness between the metal and the rubber was evaluated for each of the metal-rubber composite 10 samples thus obtained, by the methods described below. The results are shown in Table 1.
(1) Measurement of a Ratio of Metal Element Concentrations ($C_1/C_2$)

A ratio ($C_1/C_2$) of the metal element concentrations ($C_1$, $C_2$) was measured by: observing the vicinity of the adhesion interface of the metal 1 and the rubber 2 by a transmission electron microscope (TEM) and carrying out an elemental mapping analysis by STEM-EDX (Scanning Transmission Electron Microscope-Energy Dispersive X-ray); then extracting a concentration distribution curve (at 2 nm scan-line interval) for each of bismuth and nickel elements; measuring the arithmetic average concentration ($C_1$) of bismuth and/or nickel in a region $B_1$ within 100 nm measured from an adhesion interface AI of the metal 1 and the rubber 2 toward the rubber side; measuring the arithmetic average concentration ($C_2$) of bismuth and/or nickel in a region $B_2$ between the 100 nm depth and the 200 nm depth, measured from the adhesion interface AI of the metal 1 and the rubber 2 toward the rubber side; calculating a ratio ($C_1/C_2$) of $C_1$ with respect to $C_2$; repeating the measurement and collecting a ratio ($C_1/C_2$) at another site different from the previous measurement; and calculating the average of the two ratio values thus obtained, as the final data for use.

It should be noted that a concentration ratio ($C_1/C_2$) of bismuth was measured for each of the metal-rubber composite 10 samples of Example 1 and Comparative Example 1, while a concentration ratio ($C_1/C_2$) of nickel was measured for the metal-rubber composite 10 sample of Example 2. The device and the observation condition employed in the measurements are as follows.

TEM device: Transmission electron microscope "JEM-F200" manufactured by JEOL Ltd.

Observation condition: Acceleration voltage=200 kV

A section for observation was subjected to a thin film processing such that the film thickness was approximately 100 nm by using a FIB (Focused Ion Beam) device at an acceleration voltage of 30 kV. The device employed in the thin film processing is as follows.

FIB device: (Dual beam low acceleration FIB/SEM combined system) "XVision 200 DB" manufactured by SII NanoTechnology Inc.
(2) Evaluation of Adhesiveness Adhesiveness of each of the metal-rubber composite 10 samples thus prepared was evaluated by: peeling the rubber at one time from all of the five steel cords other than the two steel cords at the respective ends, of the seven steel cords of the metal-rubber composite 10 sample; and calculating an area percentage of the coating rubber still remaining on the steel cords, as a rubber coating ratio, for evaluation. The larger rubber coating ratio represents the better adhesiveness between the metal and the rubber.

TABLE 1

| | | | Comp. Example 1 | Comp. Example 2 | Comp. Example 3 | Example 1 | Example 2 | Example 3 | Example 4 |
|---|---|---|---|---|---|---|---|---|---|
| Blend formulation | Natural rubber *1 | Parts by mass | 30 | 30 | 30 | 30 | 30 | 30 | 30 |
| | Styrene-butadiene copolymer rubber *2 | | 70 | 70 | 70 | 70 | 70 | 70 | 70 |
| | Carbon black *3 | | 60 | 60 | 60 | 60 | 60 | 60 | 60 |
| | Antioxidant *4 | | 2 | 2 | 2 | 2 | 2 | 2 | 2 |
| | Silica *5 | | — | — | — | 10 | 10 | 20 | — |
| | Oil *6 | | 5 | 5 | 5 | 5 | 5 | 5 | 5 |
| | Phenol resin *7 | | 3 | 3 | 3 | — | 3 | 3 | 3 |
| | Resorcin *8 | | — | — | — | 3 | — | — | — |
| | Sulfur | | 3 | 3 | 3 | 3 | 3 | 3 | 3 |
| | Vulcanization accelerator *9 | | 0.6 | 0.6 | 0.6 | 0.6 | 0.6 | 0.6 | 0.6 |
| | Chlorinated paraffin *10 | | — | — | — | — | — | — | 10 |
| | Zinc white | | 10 | 10 | 10 | 10 | 10 | 10 | 10 |
| | Bismuth neodecanoate *11 | | 7 | — | — | 7 | 8 | 8 | 8 |
| | Nickel 2-ethylhexanoate *12 | | — | — | 5 | — | — | — | — |
| | Zinc dimethacrylate *13 | | 2 | 2 | 2 | 2 | 2 | 2 | 2 |

TABLE 1-continued

|  |  |  | Comp. Example 1 | Comp. Example 2 | Comp. Example 3 | Example 1 | Example 2 | Example 3 | Example 4 |
|---|---|---|---|---|---|---|---|---|---|
|  | β-naphthol *14 |  | 2 | 2 | 2 | — | 2 | 2 | 2 |
|  | Hexakis(methoxymethyl)melamine *15 |  | 5 | 5 | 5 | 5 | 5 | 5 | 5 |
| Evaluation results | Ratio of metal element concentrations ($C_1/C_2$) | — | 1.1 | — | 6.5 | 11.3 | 24.5 | 45.7 | 50.0 |
|  | Rubber coating ratio | % | 0 | 0 | 80 | 100 | 90 | 100 | 90 |

*1 Natural rubber: RSS3 (Classification according to "International Standards of Quality and Packing for Natural Rubber Grades")
*2 Styrene-butadiene copolymer rubber: "SBR1500" manufactured by JSR Corporation
*3 Carbon black: HAF-grade carbon black
*4 Antioxidant: "Nonflex OD-3" manufactured by Seiko Chemical Co., Ltd.
*5 Silica: "Nipsil AQ" manufactured by Toso Silica Corporation
*6 Oil: "Diana Process Oil AH-58" manufactured by Idemitsu Kosan Co., Ltd.
*7 Phenolic resin: "SUMILITERESIN ® PR-12687" manufactured by Sumitomo Bakelite Co., Ltd.
*8 Resorcin: "RESORCINOL" manufactured by Sumitomo Chemical Co., Ltd.
*9 Vulcanization accelerator: "Nocceler NS" manufactured by Ouchi Shinko Chemical Industrial Co., Ltd.
*10 Chlorinated paraffin: "EMPARA 70" manufactured by Ajinomoto Fine-Techno Co., Inc.
*11 Bismuth neodecanoate: Bismuth content = 27 mass %, manufactured by DIC Corporation
*12 Nickel 2-ethylhexanoate (nickel octylate): Nickel 2-ethylhexanoate, nickel content = 14 mass %, manufactured by DIC Corporation
*13 Zinc dimethacrylate: "ACTOR ZMA" manufactured by Kawaguchi Chemical Industry Co., Ltd.
*14 β-naphthol: "β-Naphthol" manufactured by Mitsui Fine Chemicals, Inc.
*15 Hexakis(methoxymethyl)melamine: "CYREZ964RPC" manufactured by Cytec Industries Japan Llc.

It is understood from Table 1 that the metal element(s) exists in a condensed state in the vicinity of the adhesion interface AI of the metal 1 and the rubber 2, on the rubber 2 side, in the metal-rubber composite 10 samples of Examples according to the present disclosure, whereby those samples unanimously exhibit superior adhesiveness.

INDUSTRIAL APPLICABILITY

The metal-rubber composite of the present disclosure is applicable to a conveyor belt, a hose, a rubber track, a tire, and the like.

REFERENCE SIGNS LIST

1: Metal
2: Rubber
10: Metal-rubber composite
AI: Adhesion interface of metal and rubber
$B_1$: Region within 100 nm measured from adhesion interface of metal and rubber toward the rubber side
$B_2$: Region between 100 nm depth and 200 nm depth, measured from adhesion interface of metal and rubber toward the rubber side

The invention claimed is:

1. A metal-rubber composite, comprising a metal and a rubber of which at least a portion is adhered to the metal, the composite characterized in that:
   the metal is plated with zinc;
   the rubber is composed of a rubber composition containing at least one selected from the group consisting of:
   (1) a metal salt of carboxylic acid, having 2 to 25 carbon atoms and any of bismuth, copper, antimony, silver, niobium, molybdenum, zirconium, and nickel as the metal species thereof; and (2) a compound represented by general formula (A) shown below, $$[(RCOO)_xMO]_3Z \quad (A)$$

in the general formula (A), "Z" represents one of formulae (z-1), (z-2), (z-3) and (z-4) shown below, "M" represents bismuth, copper, antimony, silver, niobium, molybdenum, zirconium or nickel, each "(RCOO)" independently represents a residue of $C_2$-$C_{25}$ aliphatic carboxylic acid, and "x" represents an integer equal to {(valence of M)−1};

  (z-1)

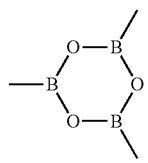  (z-2)

  (z-3)

  (z-4)

a ratio ($C_1/C_2$) of the total concentration ($C_1$) of at least one metal element selected from the group consisting of bismuth, copper, antimony, silver, niobium, molybdenum, zirconium, and nickel originally contained in the rubber in a region within 100 nm measured from an adhesion interface of the metal and the rubber toward the rubber side, with respect to the total concentration ($C_2$) of at least one metal element selected from the group consisting of bismuth, copper, antimony, silver, niobium, molybdenum, zirconium, and nickel originally contained in the rubber in a region between the 100 nm depth and the 200 nm depth, measured from the adhesion interface toward the rubber side, is 7.0 or larger.

2. The metal-rubber composite of claim 1, wherein the rubber is composed of a rubber composition containing 0.01 to 10 parts by mass of sulfur with respect to 100 parts by mass of a rubber component.

3. The metal-rubber composite of claim 2, wherein the metal is plated with only zinc.

4. The metal-rubber composite of claim 1, wherein the rubber is composed of a rubber composition containing ≥2 parts by mass of silica with respect to 100 parts by mass of a rubber component.

5. The metal-rubber composite of claim 1, wherein the rubber is composed of a rubber composition containing ≥1 parts by mass of resorcin with respect to 100 parts by mass of a rubber component.

6. The metal-rubber composite of claim 1, wherein the rubber composition contains said "(1) a metal salt of carboxylic acid" and the metal species in the metal salt of carboxylic acid (1) is bismuth or copper.

7. The metal-rubber composite of claim 1, wherein the rubber composition contains the metal salt of carboxylic acid (1) and the carboxylic acid in the metal salt of carboxylic acid (1) is an aliphatic monocarboxylic acid or an aliphatic dicarboxylic acid.

8. The metal-rubber composite of claim 7, wherein the carboxylic acid in the metal salt of carboxylic acid (1) is a $C_{2-20}$ saturated aliphatic monocarboxylic acid.

9. The metal-rubber composite of claim 8, wherein the carboxylic acid in the metal salt of carboxylic acid (1) is 2-ethylhexanoic acid, neodecanoic acid, hexadecanoic acid or octadecanoic acid.

10. The metal-rubber composite of claim 1, wherein the rubber composition contains said "(2) a compound" and that "M" in the compound (2) is bismuth or copper.

11. The metal-rubber composite of claim 1, wherein the rubber composition contains the compound (2) and that "Z" in the compound (2) has a structure represented by the formula (z-1).

12. The metal-rubber composite of claim 1, wherein the rubber composition contains the compound (2) and "(RCOO)" in the compound (2) is a residue of a $C_{2-20}$ saturated aliphatic monocarboxylic acid.

13. The metal-rubber composite of claim 12, wherein (RCOO) in the compound (2) is a residue of 2-ethylhexanoic acid, a residue of neodecanoic acid, a residue of hexadecanoic acid or a residue of octadecanoic acid.

14. A conveyor belt, characterized in that it has the metal-rubber composite of claim 1.

15. A hose, characterized in that it has the metal-rubber composite of claim 1.

16. A rubber track, characterized in that it has the metal-rubber composite of claim 1.

17. A tire, characterized in that it has the metal-rubber composite of claim 1.

18. The metal-rubber composite of claim 1, wherein a ratio ($C_1/C_2$) of the total concentration ($C_1$) of at least one metal element selected from the group consisting of bismuth, antimony, silver, niobium, molybdenum, and zirconium in a region within 100 nm measured from an adhesion interface of the metal and the rubber toward the rubber side, with respect to the total concentration ($C_2$) of at least one metal element selected from the group consisting of bismuth, antimony, silver, niobium, molybdenum, and zirconium in a region between the 100 nm depth and the 200 nm depth, measured from the adhesion interface toward the rubber side, is 7.0 or larger.

19. The metal-rubber composite of claim 18, wherein the at least one metal element is selected from the group consisting of molybdenum and zirconium.

20. The metal-rubber composite of claim 3, wherein the at least one metal element is selected from the group consisting of molybdenum, zirconium and nickel.

* * * * *